(12) United States Patent
Richter

(10) Patent No.: US 9,994,263 B1
(45) Date of Patent: Jun. 12, 2018

(54) REARRANGABLE VEHICLE TAILGATE

(71) Applicant: Burke Richter, Holcomb, KS (US)

(72) Inventor: Burke Richter, Holcomb, KS (US)

( * ) Notice: Subject to any disclaimer, the term of this patent is extended or adjusted under 35 U.S.C. 154(b) by 0 days. days.

(21) Appl. No.: 15/441,418

(22) Filed: Feb. 24, 2017

(51) Int. Cl.
| | |
|---|---|
| *B62D 33/03* | (2006.01) |
| *B62D 33/027* | (2006.01) |
| *B60P 1/43* | (2006.01) |
| *B60R 11/06* | (2006.01) |
| *B60R 5/04* | (2006.01) |
| *B65G 69/28* | (2006.01) |

(52) U.S. Cl.
CPC .......... *B62D 33/0273* (2013.01); *B60P 1/435* (2013.01); *B60R 5/04* (2013.01); *B60R 11/06* (2013.01); *B62D 33/03* (2013.01); *B65G 69/28* (2013.01)

(58) Field of Classification Search
CPC .... B62D 33/0273; B62D 33/03; B65G 69/28; B60R 11/06; B60R 5/04; B60P 1/435
USPC ........................ 296/62, 61, 57.1, 51, 55, 59
See application file for complete search history.

(56) References Cited

U.S. PATENT DOCUMENTS

| | | | | |
|---|---|---|---|---|
| 5,205,603 | A * | 4/1993 | Burdette, Jr. ............. | B60R 3/02 182/195 |
| 5,244,335 | A | 9/1993 | Johns | |
| 5,312,149 | A * | 5/1994 | Boone ..................... | B60P 1/435 296/61 |
| 5,685,594 | A * | 11/1997 | Harper ............... | B62D 33/0273 292/175 |
| 6,834,903 | B2 * | 12/2004 | Harper .................. | B62D 33/03 296/51 |
| 6,874,839 | B2 * | 4/2005 | Acker ................ | B62D 33/0273 296/51 |
| 6,991,277 | B1 * | 1/2006 | Esler ....................... | B60P 1/435 296/26.08 |
| 7,513,552 | B2 * | 4/2009 | Carvalho ................ | B60P 1/431 296/26.09 |
| 7,549,692 | B2 * | 6/2009 | Washington ............ | B60P 1/435 296/61 |
| 7,628,439 | B1 * | 12/2009 | Strong ............... | B62D 33/0273 108/44 |
| 7,712,811 | B2 * | 5/2010 | Heaman ............. | B62D 33/0273 296/26.08 |
| 8,079,628 | B2 * | 12/2011 | Micheli ................... | B60P 3/423 296/57.1 |
| 8,348,325 | B2 * | 1/2013 | Hausler .............. | B62D 33/0273 296/51 |
| 8,740,279 | B1 * | 6/2014 | McGoff ................. | E05B 83/20 296/51 |
| 9,670,013 | B2 * | 6/2017 | Parrish ................... | B65G 69/30 |

(Continued)

*Primary Examiner* — Jason S Morrow
*Assistant Examiner* — E Turner Hicks
(74) *Attorney, Agent, or Firm* — Intellectual Property Center, LLC; Arthur K. Shaffer

(57) ABSTRACT

The present invention provides a rearrangable vehicle tailgate for transporting an item within a bed of a vehicle, including a first and third section separated by a second section, the first and third section secured to a tailgate receiver associated with the vehicle and providing access to the bed, an enclosed compartment associated with each of sections and configured to receive a removable internal structure, where at least one controller is secured to the enclosed compartment by the removable internal structure and configured for receiving and storing an item during transport by the vehicle.

9 Claims, 11 Drawing Sheets

(56) References Cited

U.S. PATENT DOCUMENTS

2003/0122396 A1* 7/2003 Humphrey ......... B62D 33/0273
  296/51

* cited by examiner

REARRANGABLE VEHICLE TAILGATE

FIELD OF THE INVENTION

The present invention is broadly directed to truck tailgate and, more particularly, to improved vehicle tailgate with multiple sections each presenting a rearrangable compartment.

BACKGROUND OF THE INVENTION

Pickup trucks typically have a bed with a rear rectangular opening which allows for use of the pickup bed for transporting various items. The tailgate of the pickup bed is typically positioned in one of two positions, up or down. For larger items, the rear of the bed is typically used in the down position where it is rotated into a horizontal position. For smaller items or during transport, the tailgate is typically positioned in the up position where it is positioned into a vertical position. In the down position, large items can be lifted into the bed and allowed to extend outwardly from the bed. Lifting these larger items can require multiple people to lift the item up and into the bed, even with the tailgate in the down position. In addition, items may slide out of the bed if the tailgate is left in a down position. Therefore, the bed of the tailgate is typically left up during transport which can negatively impact the fuel efficiency of the truck.

In addition, the traditional pickup bed has additional disadvantages. For example, some people have trouble reaching into the bed of the pickup because they are not tall enough or the pickup is too tall. Similarly, it can be difficult to reach across an open tailgate to access items within the bed. In addition, items can slide around within the bed of a pickup truck during transport and become damaged. Other times, in an effort to contain the items within the bed, storage boxes are used which obstruct and occupy the limited space within the bed.

Accordingly, there is a need for an improved vehicle tailgate which allows for multiple compartments which can be rearranged for multiple sections while addressing at least a portion of the aforementioned shortcomings.

SUMMARY OF THE INVENTION

The present invention includes an improved vehicle tailgate for a transporting an item within a bed of a vehicle, which in one embodiment includes a first and third section separated by a second section, said first and third section secured to a tailgate receiver associated with said vehicle and providing access to said bed, an enclosed compartment associated with each of said first, second and third sections presenting an internal structure configured for removable receipt of a controller secured to said enclosed compartment by said internal structure and configured for receiving and storing an item during transport by the vehicle.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

DETAILED DESCRIPTION OF THE INVENTION

Figure 1:
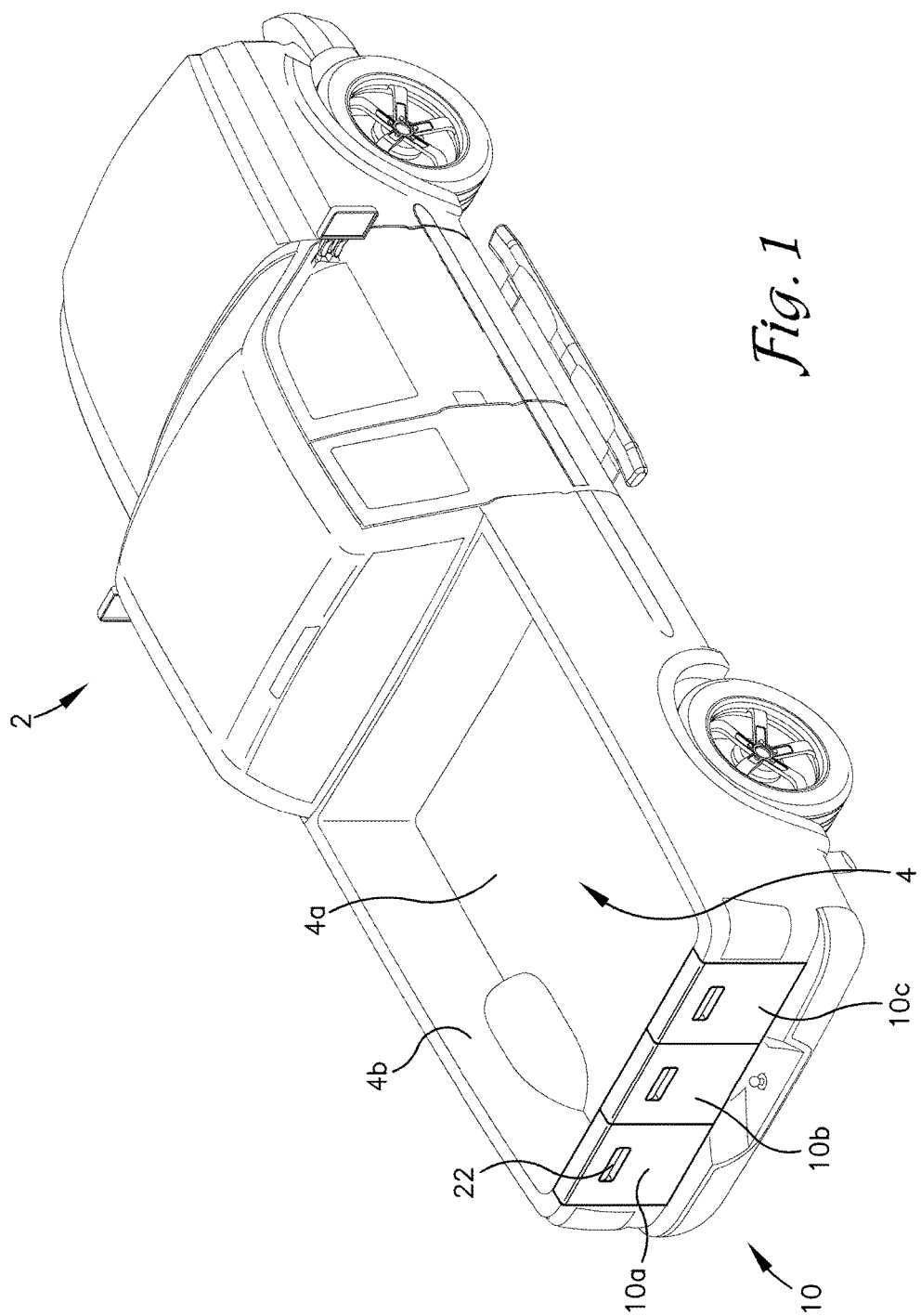
FIG. 1 is a rear perspective view of an exemplary tailgate embodiment of the present invention in association with an exemplary vehicle.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 10 generally refers to an embodiment of the present invention, rearrangable vehicle tailgate 10 adapted for receipt within a gate receiver 6 of a standard pickup bed 4. The rearrangable vehicle tailgate 100 includes a first, second and third section (also referred to herein as a door) 12a, 12b, 12c which generally provide selective access to the standard pickup bed 4 while allowing for partially enclosed transport of large or outwardly extending items. For example, one of the sections 12a, 12b, 12c associated with the rearrangable vehicle tailgate 10 could remain positioned in a lowered or open position for passage of various extended items into the bed or for strapping material down while a different one of the first, second or third sections 12a,12b,12c is positioned in an upper or closed position. In this way, the rearrangable vehicle tailgate 10 allows for an improvement in transporting, storage and loading various items for transport within the standard vehicle bed 4.

The exemplary rearrangable vehicle tailgate 10 is shown in FIG. 1 in association with an exemplary vehicle 2 (a truck) having a standard vehicle bed 4 with a bottom 4a and sidewalls 4b extending circumferentially along the bottom 4a and presenting gate receiver 6 which is generally configured for openable receipt of a standard hitch or gate which when coupled to the gate receiver 6 provides an enclosure for the receipt and transportation of various items (not shown) contained therein. When used in association with a vehicle 2, the rearrangable vehicle tailgate 10 provides for transportation of extended length items, extending outwardly from the bed 4 while allowing for secured storage and transportation of the contained items (not shown). The various embodiments of the rearrangable vehicle tailgate 10 described hereinafter, while illustrated with a pick-up truck 2, may be used in any suitable vehicle.

Figure 2:
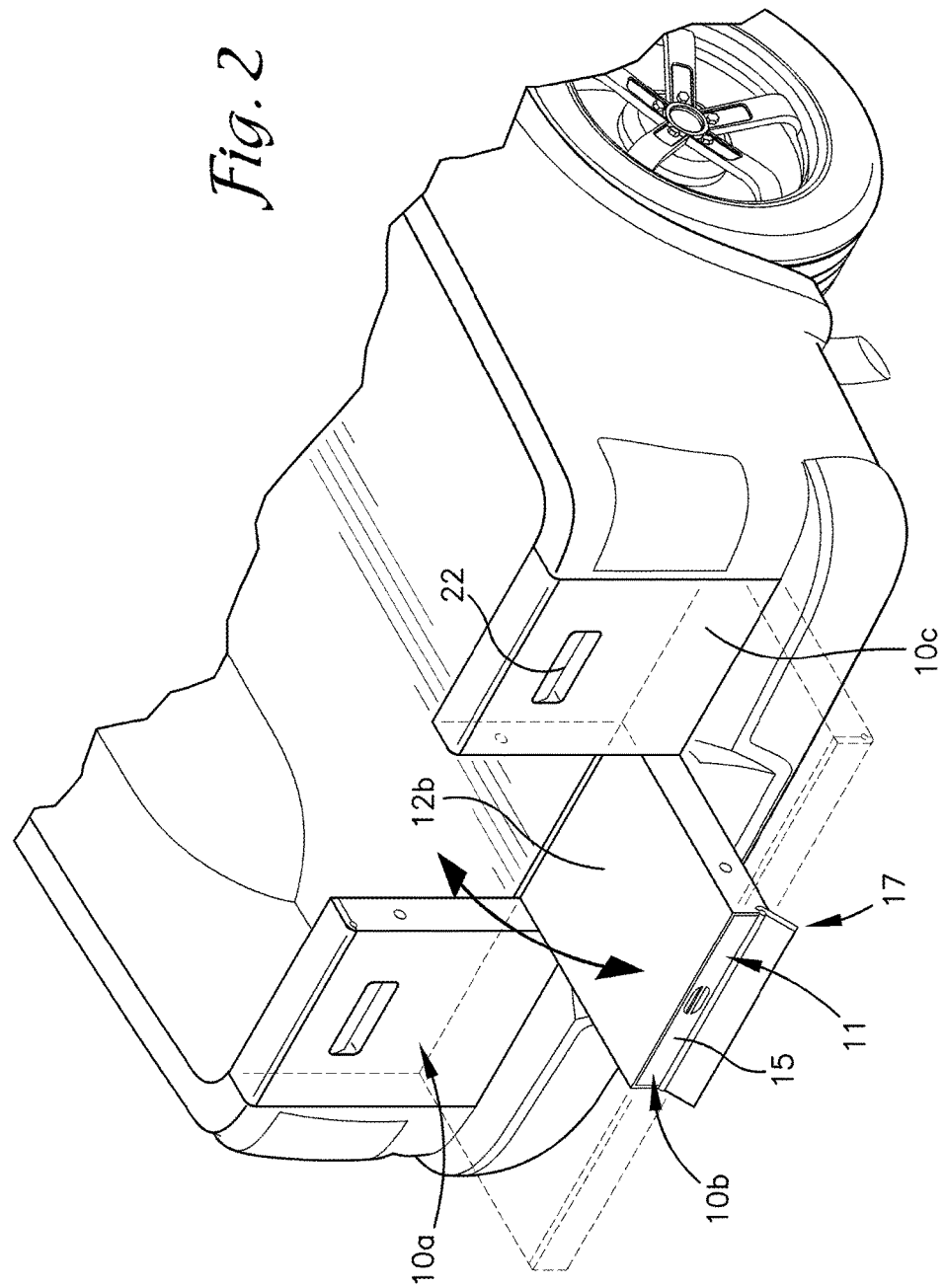
FIG. 2 is a partial rear perspective of the exemplary tailgate embodied in FIG. 1 with one door in a lowered position.

The illustrated rearrangable vehicle tailgate 10 can be positioned in the same or substantially the same location as a conventional tailgate, using generally known connecting structure on the left and right sides of the gate receiver 6. However, the illustrated rearrangable vehicle tailgate 10 can be rearranged into various configurations to provide selective access to the cargo bed 4 with the inventive compartments which may be selectively rearranged for transport of items and selective enclosure of various areas of the cargo bed 4. For example, as illustrated in FIG. 2, the rearrangable vehicle tailgate 10 may include first, second and third doors 12a, 12b, 12c, which can independently rotate between the secured closed position, in a substantially vertical position, and the secured open position, in a substantially horizontal position. Further an enclosed compartment 41 is associated with each of the sections 12a, 12b, 12c and includes a rotatable cover 17 and is configured for receiving a controller 11 secured to the enclosed compartment 41 by an internal structure 40 The controller 11 is generally configured for securely receiving an item (not shown) for storage during transport of the vehicle. The controller 11, depicted in FIG. 2 generally includes a handled end 15 for stored access of the item and is configured for retractable receipt within the enclosed compartment 41 which is further described below. Generally, the controller 11 moves between a stored and an open position and allows for controlling the stored item during transport by the vehicle 2. The internal structure 40 is configured to allow for selective removal and receipt of the controller 11 between enclosed compartments 41, to provide the desired configuration.

In the embodiment illustrated in FIG. 1, the rearrangable vehicle tailgate 10 includes the first, second and third sections 12a, 12b, 12c, each having a general equally proportionate width, although other configurations are possible. Each of the first, second and third sections 12a, 12b, 12c includes a outersheath similar to existing vehicle panels with an innerwall spaced apart from an outerwall, the innerwall associated with the vehicle bed 4. Generally, the rearrangable vehicle tailgate 10 extends within the gate receiver 6 from a lower end associated with the vehicle bed 4 to an upper end extending outwardly from the vehicle bed 4 and between a left side and a right side. The outersheath associated with each of the first, second and third sections 12a, 12b, 12c generally encompass each enclosed compartment 41 and includes the internal structure 40 which is generally configured for removable receipt of each controller 11.

Each of the first, second and third sections 12a, 12b, 12c includes a handle 22 located on the outerwall. The handle 22 generally operates and is in communication with a latching mechanism 20. In the depicted embodiment it is shown as being located on the outerwall of the first, second and third sections 12a, 12b, 12c with the operable latching mechanism 20 located within the interior of each of the first, second and third sections 12a, 12b, 12c. Generally the enclosed compartment 41 has a rectangular configuration with internal structure 40, such as mechanically linking members like rails, bars or rods operably connected to a moveable member providing for movement of the controller 11 along or from the internal structure 40 as desired for storage of items during transport.

As illustrated in FIG. 2, the optional rotatable cover 17 associated with each door, 12a, 12b, 12c is generally rotated for protective access of enclosed compartment 41 and the controller 11 stored therein. The cover 17 generally protects the enclosed compartment 41 from environmental conditions like dirt, moisture or dust.

Figure 3:
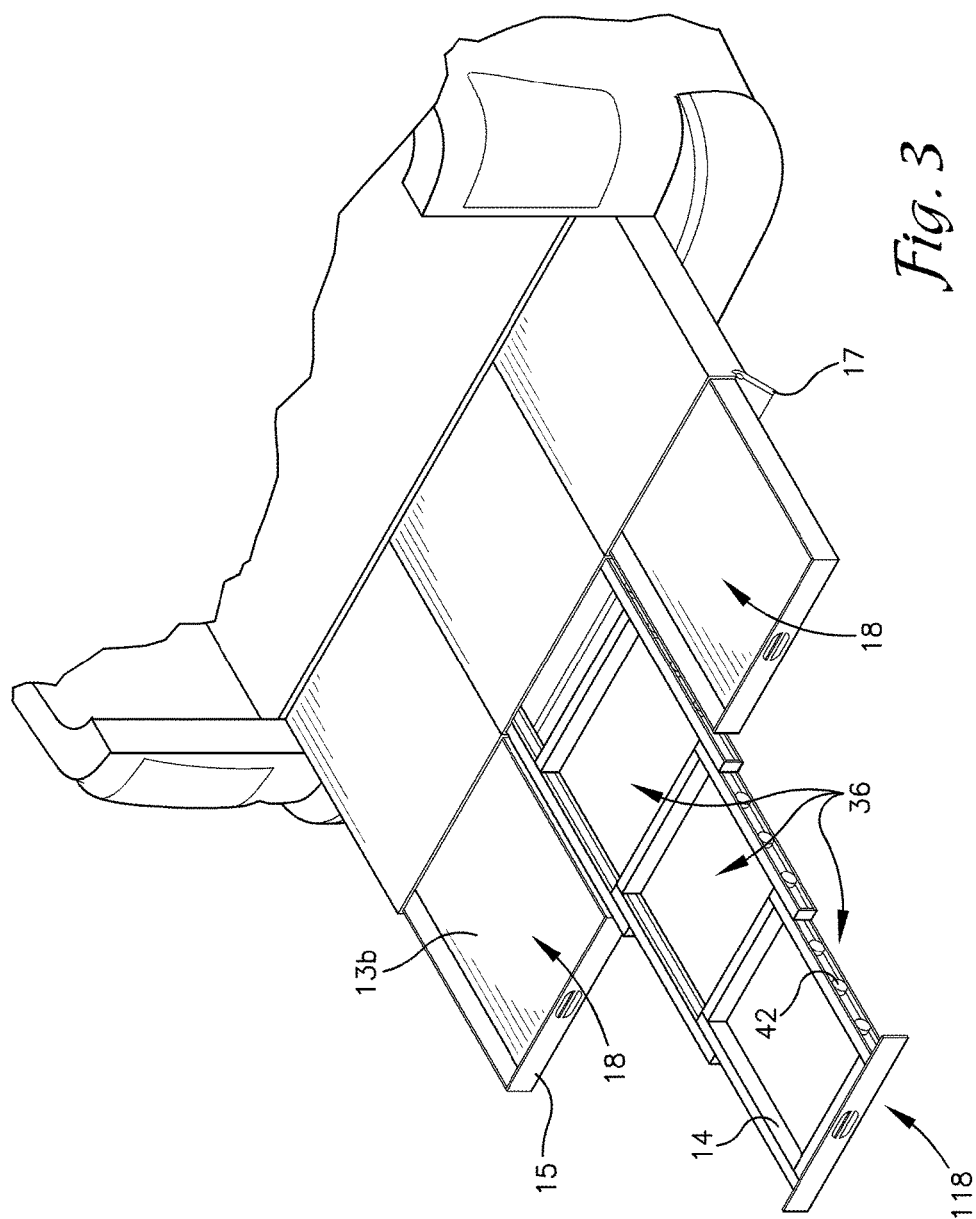
FIG. 3 is a partial rear perspective of the exemplary tailgate embodied in FIG. 1 with three doors in a lowered and open position showing an exemplary configuration.

The controller 11 can have a variety of different configurations for storing and transporting a variety of items (not shown) in association with the truck bed 4. Each controller 11 can be generally retracted within each enclosed compartment 41 of the first, second and third sections 12a, 12b, 12c. Generally, the controller 11 includes a pair of side rails 13 separated by a handle end 15. The controller 11 generally slides from a stored position outwardly from each section 12a, 12b. 12c with the internally connected structure 40 remaining secured within each enclosed compartment 41 thereby maintaining communication and facilitating retractable storage of each controller 11 within each section 12a, 12b, 12c. As illustrated in FIG. 3, various controllers 11 may be utilized to provide retractable storage. One embodiment of the controller 11 is includes a drawer 18 configuration while another includes a telescoping structure 118.

As previously stated, each section 12a, 12b, 12c includes the enclosed compartment 41 in receipt of the removable controller 11 which can be selectively removed from the enclosed compartment 41 and interchanged with another controller 11 for selective reconfiguration of the first, second and third sections 12a, 12b, 12c. In this way, the rearrangable vehicle tailgate 10 can be reconfigured by removing different controllers 11 from different sections 12a, 12b, 12c. The controllers 11 being retractable within the enclosed compartment 41 can be configured differently for retrievable storage of various items during transport based upon the desired use of the vehicle bed 4.

The controller 11 with the drawer 18 configuration is illustrated with the first and third section 12a, 12c in FIG. 2. The drawer 18 is presented by a pair of spaced apart side rails 13 with a spanning handle end 15 encircling a bottom 13b, for storing and organizing various items such as tools and other items for organized transport and may further include optional drawer organizing structures (not shown) which may be beneficial for organizing and storing the contained items (not shown) during transport.

FIG. 2 also illustrates the controller 11 with telescoping structure 118 removably connected to the internal structure 40 for receipt by the enclosed compartment 41. The telescoping structure 118 extends outwardly from the second or middle section 12b. The telescoping structure 118 is presented by a plurality of spanning sidewall pairs 14 spanned by a distal and proximate end and adapted for nested receipt of the proceeding sidewall pair 14. The depicted configuration of the telescopic structure 118 illustrates telescopic operation with the outermost spanning sidewall pair 14 being nested within the innermost position and connected by the handle end 15 for telescopic communication between the middle section 12b, each of the successively positioned spanning sidewall pair 14 and the handle end 15. A plurality of receivers 42 are spaced along the spanning sidewall pair 14, the receivers 42 being generally configured for securing various items using securing members such as straps, hooks and mechanical fasteners (not shown) presenting a plurality of fastener locations for securing a horizontally carried item like a large 2×4 (not shown) horizontally extending outwardly from the bed 4 at a plurality of spaced apart fastener locations extending along the spanning sidewall pair 14.

Each controller 11 include corresponding structure for releasable engagement to the internal structure 40 such as mechanical connections like hook and groove structures or roller-track connections which are generally known. In operation, the first, second and third sections 12a, 12b, 12c may be reconfigured by removing the controller 11 from the enclosed compartment 41 by disengaging the internal structure 40 and interchanging it with another one of the sections 12a, 12b, 12c as desired. By way of example, the controller 11 may be released from the internal structure 40 by disengaging the corresponding controller sidewall structure (not shown) like wheels or bearings adapted for running along complementary tracks, runners or glides located within the enclosed compartment 41 which allow form movement of both the internal structure 40 and controller while engaged or simply movement of the controller 11 while disengaged. In this way, the controller 11 can be operated within the sections 12a, 12b, 12c or removed and selectively interchanged with a different section 12a, 12b, 12c.

In operation, the telescopic structure 118 moves between a stored position and an extended position. As further illustrated in FIG. 9, the telescopic structure 118 can be extended outwardly from the vehicle bed 4 to securely transport a large item (not shown) such as, but not limited to, a 20' piece of lumber which is longer than the vehicle bed 4. In the outwardly extended position, the telescopic structure 118 allows for communication with each successive telescopic segment 36 providing selective extension of the telescopic structure 118 for securing and receiving outwardly extended items (again not shown). As previously discussed, the extended item (not shown) can be secured during transport with straps placed through the receivers 42 associated with the sidewalls of the telescopic structure 118.

Figure 9:
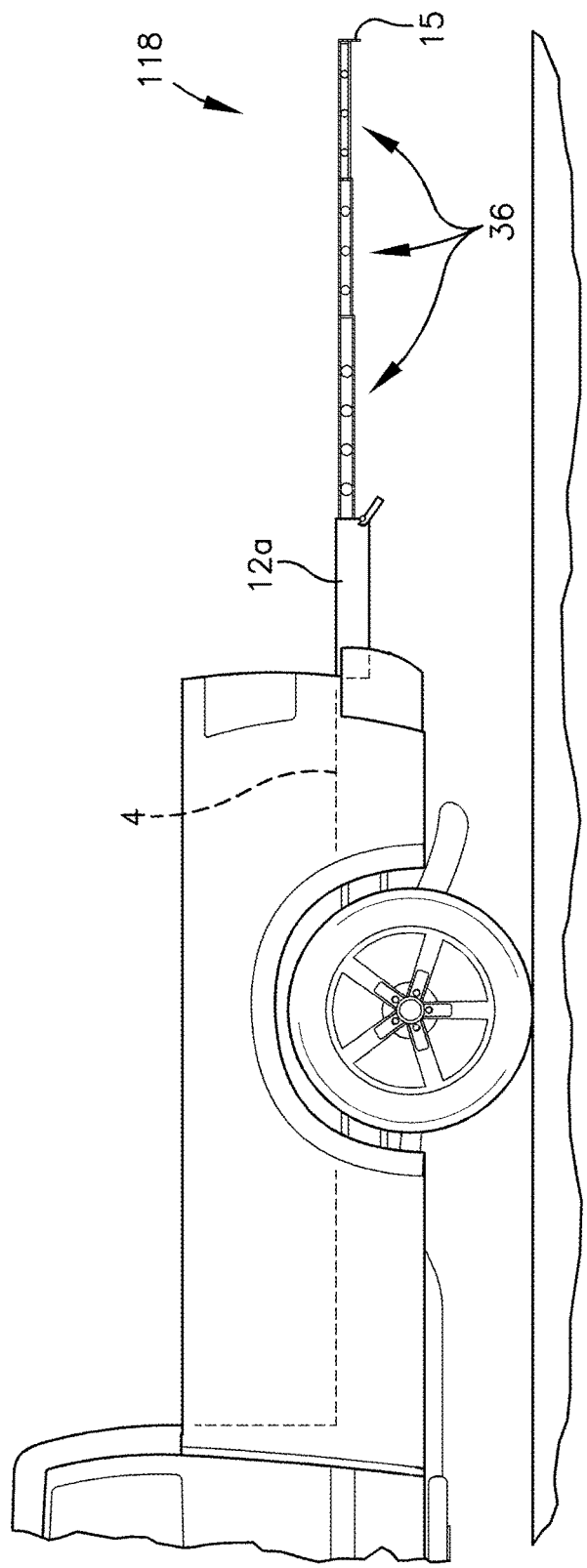
FIG. 9 is a partial side perspective of tailgate of FIG. 1 with the telescopic structure extended outwardly in accordance with an optional feature of the present invention.

As illustrated in FIG. 9 in the extended position, the telescopic structure 118 may be configured to present a substantially planar surface with an alignment mechanism, where each telescopic segment 36 is presented by the spanning sidewall pair 14 between proximal and distal ends, normal to and spanning the spanning sidewall pair 14 is vertically spaced with vertical spacers (not shown) for alignment of each telescopic segment 36, presenting a substantially planar telescopic structure 118. By aligning the telescopic segment 36, the supported item (not shown) may be aligned with the surface of the truck bed 4. In this way, the substantially planar telescoping structure 118 may position the outwardly extending item (not shown) in a horizontally aligned position along the truck bed 4 which may help reduce injuries and visual obstructions caused from improper placement of the outwardly extending item (not shown).

Figure 4:
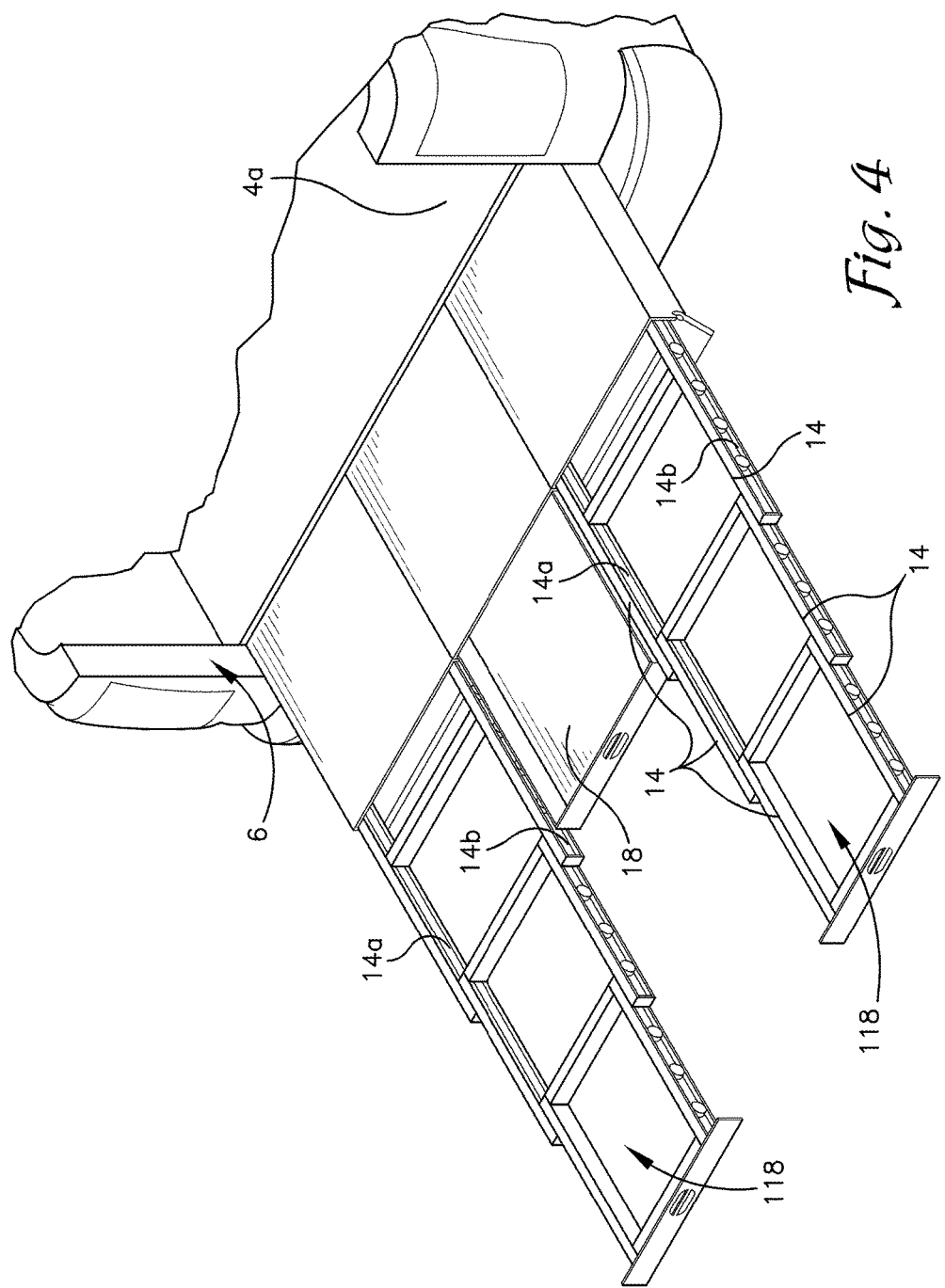
FIG. 4 is a partial rear perspective of the exemplary tailgate embodied in FIG. 1 with three doors in a lowered and open position showing an alternative configuration.
Figure 5:
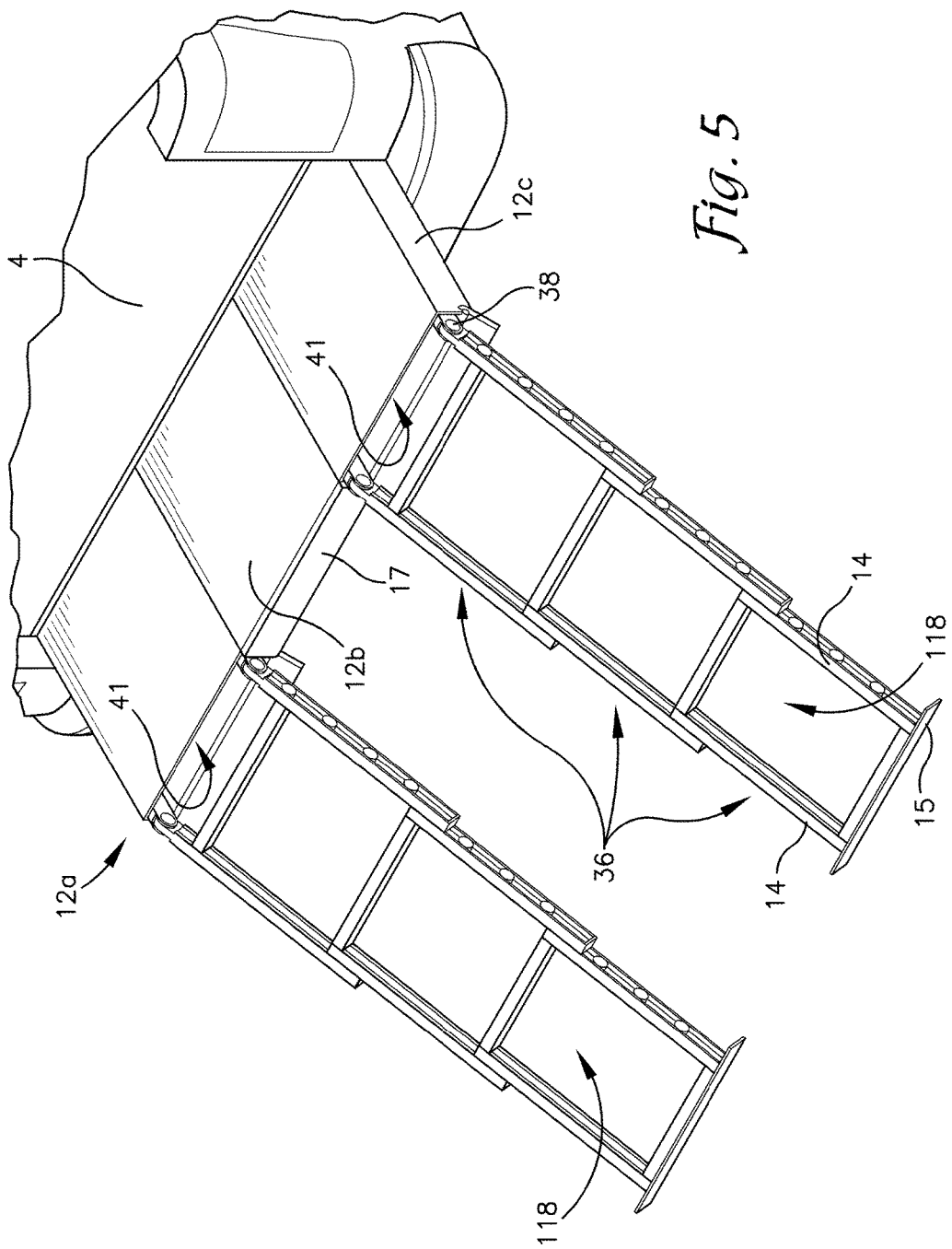
FIG. 5 is a partial rear perspective of the exemplary tailgate embodied in FIG. 4 with two telescopic structures angled downwardly illustrating an alternative aspect of the present invention.

An alternative configuration of the present invention is illustrated in FIGS. 4-5, with the first and third section 12a, 12c presenting the controller 11 with the telescopic structure 118 and the middle or second section 12b presenting the controller 11 with the drawer 18 configuration. As further illustrated in FIG. 5, a hinge 38 counectably secures the telescopic structure 118 to the internally connected structure 40 for pivoted rotation of the telescopic structure 118. In FIG. 5, the telescopic structure 118 is rotated down from the vehicle bed 4 to provide a downwardly angled ramp. As illustrated, each telescopic structure 118 is extended outwardly from the first and third sections 12a, 12c and rotated angularly about the hinge 38 which rotateably secures the telescoping structure 118 to the exemplary internally connected structure 40. Although different configurations of internally connected structure 40 may be utilized, as depicted in FIG. 5, the exemplary internally connected structure 40 includes a pair of side channels which extend horizontally under the vehicle bed 4 and through the first and third door 12a, 12c allowing the telescopic structure 118 to rotate downwardly therefrom.

Figure 10:
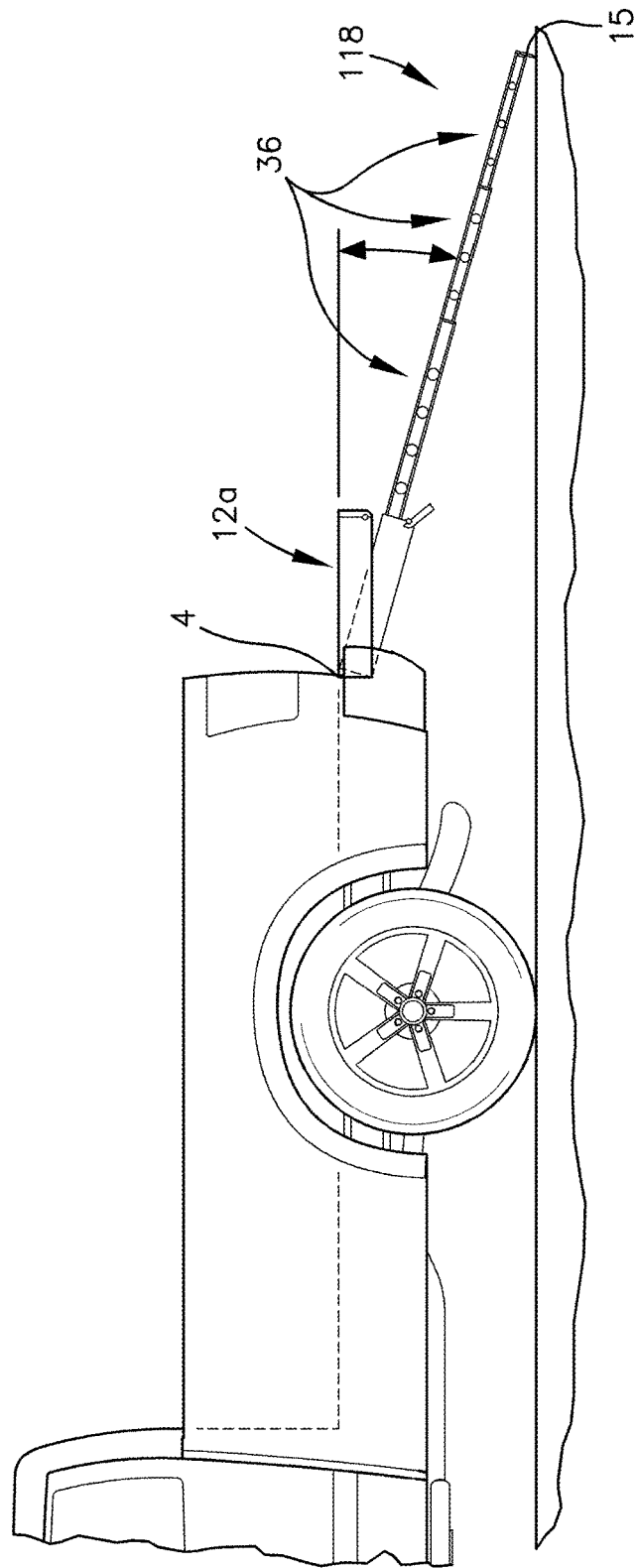
FIG. 10 is a partial side perspective of the telescopic structure of FIG. 9 angularly extending outwardly in accordance with an aspect of the present invention.

As further illustrated in FIG. 10, rotating the telescopic structure 118 downwardly from the vehicle bed 4 presents an inclined plane or ramp for carrying larger objects (not shown) from the ground into the vehicle bed 4. Using the rotated telescopic structure 118, a large, heavy object can be lifted into the bed easier and safer than traditional methods while providing a secure restraint system for securing the items (not shown) during transport. Upon reaching the desired destination, the telescopic structure 118 can once again be extended outwardly from the door 12a and rotated downward for carrying the large, heavy object (not shown) from the vehicle bed 4 to the underlying horizontal surface. Alternatively, the large heave object (not shown) may be slid down the telescopic structure 118 for lowering it from the vehicle bed 4 to the ground.

In operation, the telescopic structure 118 can be partially extended from one of the doors, 12a, 12b, 12c and then secured into a generally horizontal position as illustrated in FIG. 9. Fully extending the telescopic structure 118 allows for downward rotation from generally a horizontal orientation to an angular position, rotated less than 90 deg. as illustrated in FIG. 10, presenting an inclined ramp for transport of items (not shown) on and off the vehicle bed 4.

Upon rotation of the telescopic structure 118, the handle end 15 may be configured for rotation over the telescopic structure 118 presenting a smooth surface for easier wheeled movement of the item (not shown) along the inclined ramp presented by the rotated telescopic structure 118. In this way, the telescopic structure 118 allows for easy transport of items from a lower surface (not shown) into the vehicle bed 4. Additionally, the telescopic structure 118 may be configured to present a substantially planar surface with an alignment mechanism (not shown), where each telescopic segment 36 presented by the spanning sidewall pair 14 and proximal and distal ends, is vertically positioned with vertical spacers (not shown) for vertical alignment of the plural telescopic segments 36, presenting a substantially planar telescopic structure 118 as illustrated in FIGS. 9-10. By aligning the telescopic segments 36, the supported item (not shown) may be vertically aligned with the surface of the truck bed 4. In this way, the substantially planar telescoping structure 118 may position the outwardly extending item (not shown) in a horizontally aligned position along the truck bed 4 which may help reduce injuries caused from improperly aligned, outwardly extending items (not shown).

To provide for unproved movement between the stored and the extended position of the telescoping structure 118, it may be beneficial to reduce the friction between successive telescoping segments 36 for example along each spanning sidewall pair 14. In the exemplary embodiment of the telescoping structure 118 depicted in FIGS. 3-5, each the spanning sidewall pairs 14 may provide an inner channel 14a and an outer channel 14b, the inner channel 14a presenting a bearing receiver and the outer channel 14b presenting a plurality of bearing surfaces which cooperate with the bearing receiver 14a for reducing friction during telescopic operation of each telescopic segment 36 for nesting successive spanning sidewall pairs 14.

In the stored position illustrated in FIG. 2, the telescopic structure 118 is retracted with the telescopic segments 36 nested and the spanning sidewall pairs 14 retracted within the enclosed compartment 41 of the second or middle door 12b, the handle end 15 positioned near the middle door 12b. FIG. 2 also illustrates the rotatable cover 14 pivoted towards the open position from the closed position.

In operation of the telescopic structure 118 is depicted as moving from the stored position of FIG. 2 to the extended position of FIG. 3 with the controller 11 extending outwardly, the handle end 15 connected to the telescopic structure 118 both being extended in a generally horizontal direction from the middle door 12b, with at least one of the spanning sidewall pairs 14 extended. In the fully extended position as illustrated in FIG. 5, each of the spanning sidewall pairs 14 is extended and the pivoted hinge 38 is presented. Optionally, the handle end 15 may include an additional storage area (not shown) for stored receipt of a cloth such as a red flag which can be utilized when the telescopic structure 118 is outwardly extended. At least one biasing member (not shown) such as a spring may also be provided to help urge the telescopic structure 118 towards the stored position such that when the telescopic structure 118 is extended, pressure upon the handle end 15 may urge the telescopic structure 118 towards the stored position, each telescopic segment nested together.

Figure 6:
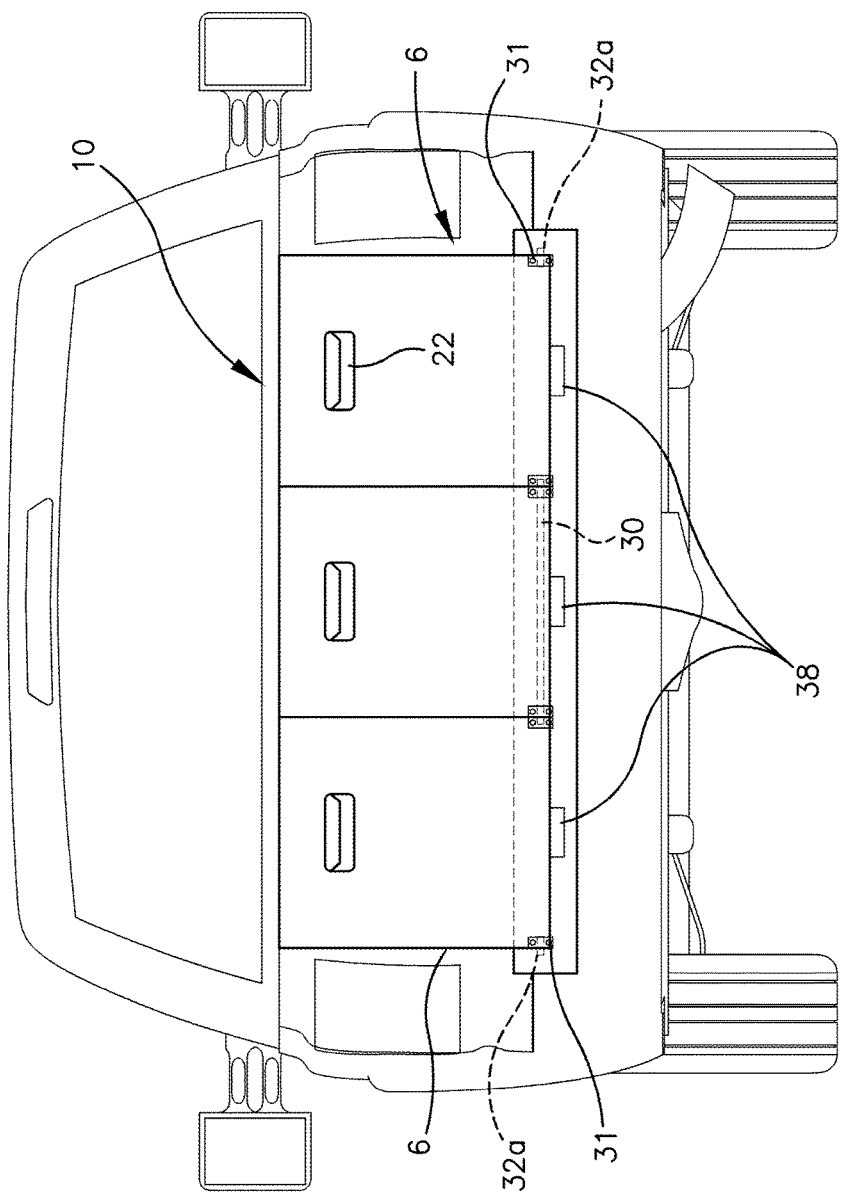
FIG. 6 is a rear elevation of the exemplary tailgate embodied in FIG. 1.

Generally, the rearrangable vehicle tailgate 10 is secured to both sides of the gate receiver 6 using connecting structure. By way of example, FIG. 6 illustrates a lower side locking member 31 located on each side of the first and third section 12a, 12c for secure connection with a lower locking receiver 32a located on each side of the gate receiver 6. Additional optional connecting structure such as an extendable rod 30 may be provided, the rod 30 extending laterally from the second or middle section 12b for secured receipt by a secondary lower locking receiver 32a associated with each first and third section 12a, 12c. Various bearings (not shown) may be utilized for smooth pivoted operation of the section 12a, 12b. 12c. In addition, a pair of hinges or bearing surfaces 38 may be connected between the vehicle bed 4 and each door 12a, 12b, 12c for pivoted operation. Connecting structure (not shown) associated with the gate receiver 6 allows for pivoted rotation of the first, second and third section 12a, 12b, 12c in unified or independent operation upon single or double operation of door handle 22.

Figure 7:
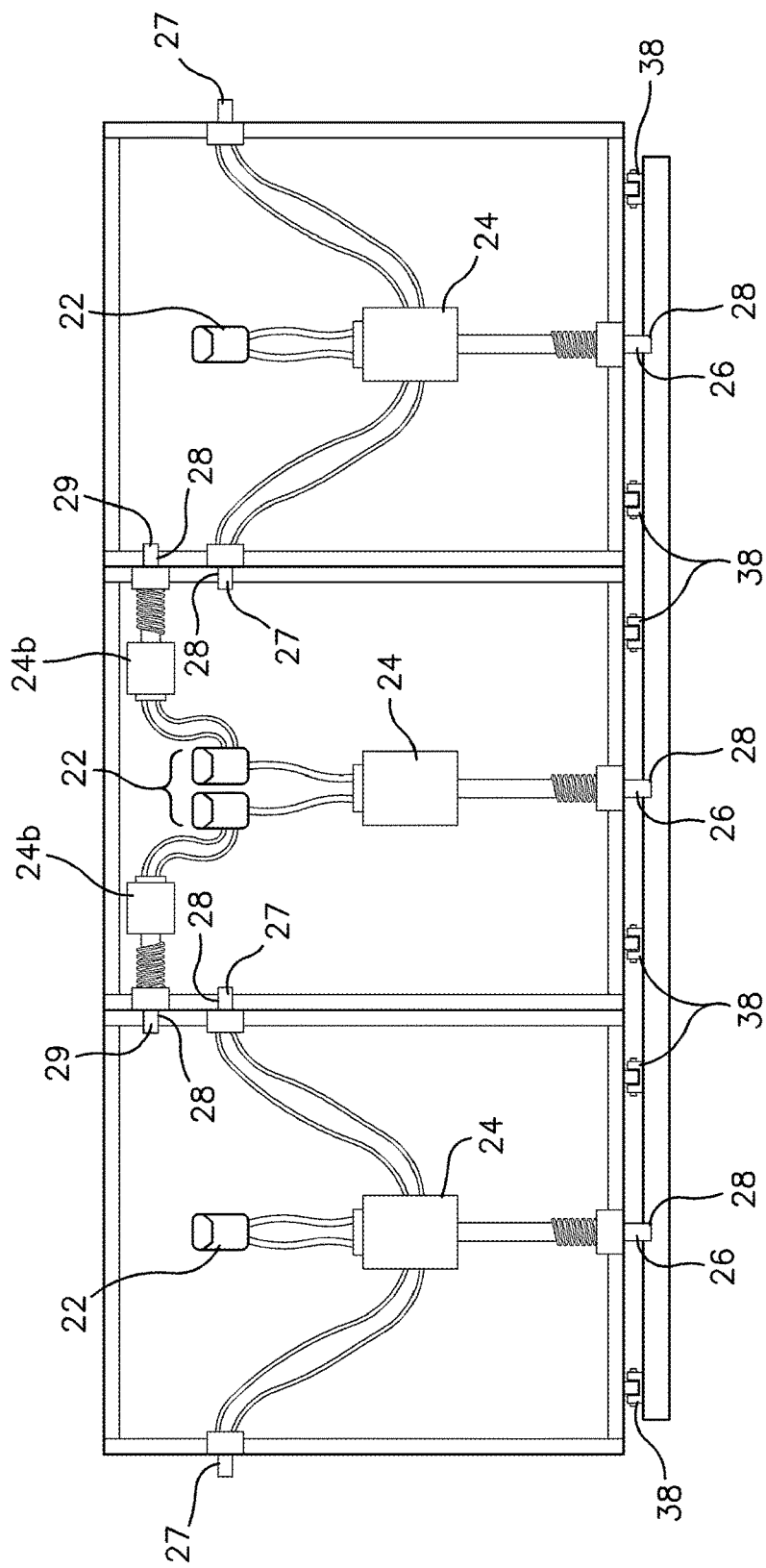
FIG. 7 is a top plan view of the tailgate embodied in FIG. 1 illustrating the exemplary operational features.
Figure 8:
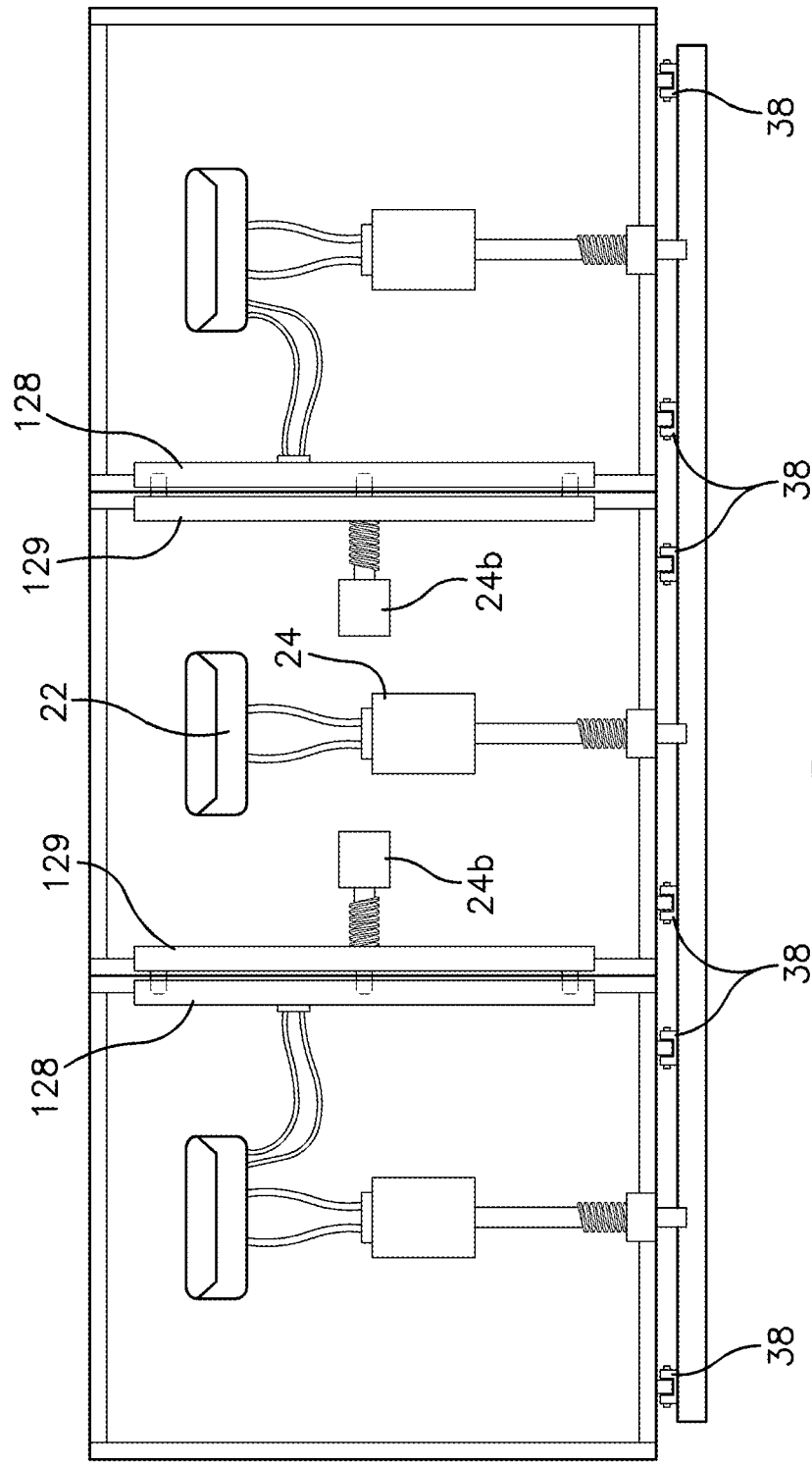
FIG. 8 is a top plan view of an alternative embodiment of the tailgate embodied in FIG. 1 illustrating alternative operational features.

In the exemplary latching mechanisms illustrated in FIGS. 7-8, operation of each handle 22 associated with each first, second and third section 12a, 12b, 12c allows for independent rotation where each may rotated separately or individually as desired. The second or middle section 12b includes a double operational handle which allows for single or unified operation of all three sections 12a, 12b, 12c to rotate together.

In the first operational condition, each handle 22 operates a downwardly moving member 26 with, for example, a solenoid 24 which when energized, engages the downwardly moving member 26 associated with each section 12a, 12b, 12c into a locking receiver 28 associated with each section 12a, 12b, 12c securing each of said section 12a, 12b, 12c in an upper or vertical position.

Generally, the solenoid 24 is positioned within each section 12a, 12b, 12c of the rearrangable vehicle tailgate 10. The second or middle section 12b allows for a second operational condition which when activated energizes a primary locking member 27 for engagement or disengagement between the adjacent first and third sections 12a, 12c allowing for independent or unified operation of the rearrangable vehicle tailgate 10. As is generally known, each handle 22 can utilize mechanical linking members or can use electromechanical components. In the illustrated embodiments, the second or middle section 12b generally includes a pair of sidewall solenoids 24b in communicating with a pair of secondary locking members 29 for engagement with the adjacent sections 12a, 12c. Each section 12a, 12b, 12c generally includes a corresponding locking receiver 28 for receipt of the primary or secondary locking member 27, 29 as further described below for selectively independent or unified operation.

Independent and unified operation of the solenoid 24 may utilize a variety or electronic, mechanical of electro-mechanical components which are generally hidden from external view. Each handle 22 is generally in communication with a solenoid 24 for selectively engaging a rigid locking members 26, primary locking member 27 and secondary locking member 29.

An electronic control module or the solenoid 24 may be used to energize one or more locking members as illustrated in FIG. 7. Generally, the sidewall solenoids 24b and the solenoid 24 may be magnetic latching solenoids which release the bottom or rigid, primary and secondary locking member 26, 27, 29 when the solenoid 24 and sidewall solenoid 24b is energized. The handles 22 may utilize traditional latching circuitry to energize and de-energize the solenoid 24 and sidewall solenoid 24b. The handle 22 associated with the middle section including a two-position switch to energize the rigid, primary or secondary locking members 26, 27, 29. In addition, an electronic control module or a plurality of electronic control modules may be utilized to achieve the desired operation. In addition, a plurality of wires or wireless technology may be utilized as desired to achieve the desired operation.

Generally, the rearrangable vehicle tailgate 10 includes a number of locking or latching members which ensure for secure independent and unified operation of the first, second and third sections 12a, 12b, 12c. In addition to the sidewall locking receivers 32a designed for receiving engaging members 31, each section, 12a, 12b, 12c may also utilize the rigid locking member 26 which is generally located at the bottom, middle of each section 12a, 12b, 12c. While each section 12a, 12b, 12c is vertically upright, the rigid locking member 26 is engaged by the bottom locking receiver 28. During rotation of the sections 12a, 12b, 12c towards a horizontal, open position, the sections 12a, 12b, 12c pivot about a pair of hinges 38 associated with each of the sections 12a, 12b, 12c. The hinges 38 illustrated in FIG. 7 may include various hinge types, including an angle bracket swivel hinge which allows for angular rotation of section 12a, 12b, 12c from a generally vertical position downwardly more than 90 degrees for example for operation of the telescoping structure 118 as a ramp. The hinges 38 may be cast from steel or aluminum with a central pin extending through the male and female brackets for pivoted movement of the hinge 38.

As further depicted in FIG. 7, a plurality of the bottom locking receivers 28 are configured with a generally laterally extending square tube member which traverses the gate receiver 6 behind and along the bottom of the bed 4 near for example a rear bumper. Each locking receiver 28 is configured for secured engagement of the bottom locking member 26. In operation, as the handle 22 is operated the bottom locking member 26 travels for engagement into the bottom locking receiver 26.

FIG. 8 illustrates an alternative locking receiver 128 in receipt of an alternative embodiment of the secondary locking member 129 operable by the sidewall solenoid. The alternative secondary locking member 129 includes a plurality of cylindrical pins connected to a pair of manifolds each of which extends vertically between the first and second sections 12a, 12b and between the second and third sections 12b, 12c for engagement by the complementary locking receiver 129. In an exemplary operation, the sidewall solenoid 24b may be de-energized for alignment of the secondary locking member 129 with the locking receiver 128. When the sidewall solenoid 24b is energized, for example when the handle 22 is moved to a secondary position, the secondary locking member 129 may be retracted from the locking receiver 128, allowing the first, second or third section 12a, 12b, 12c to rotate independently.

Figure 11:
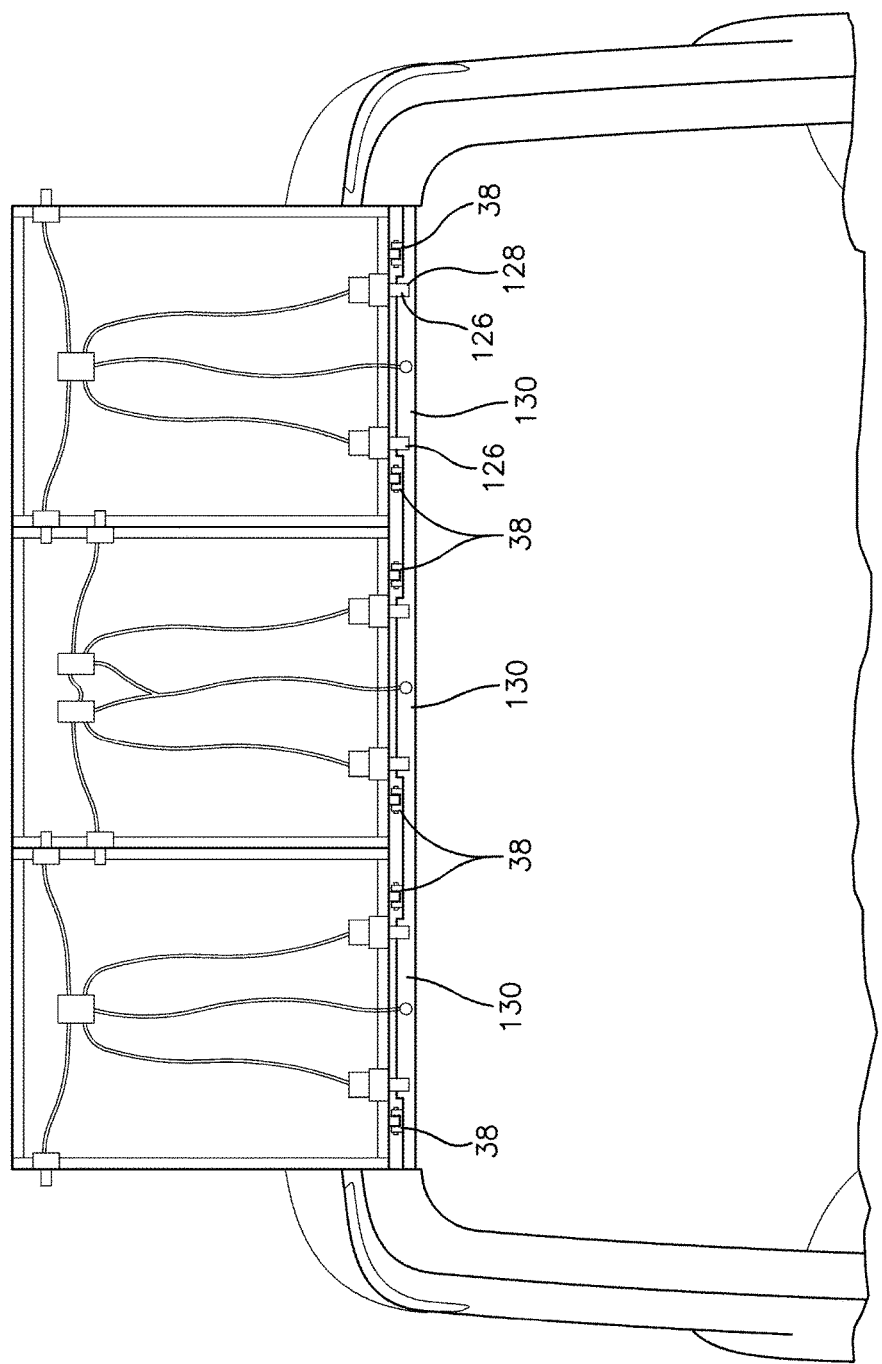
FIG. 11 is a fragmented top plan view of another alternative operational configuration of the tailgate in the lowered position in accordance with one embodiment of the present invention.

FIG. 11 illustrates another embodiment of the latching mechanism with an alternative pair of rigid locking members 126 which are generally located at the bottom of each section 12a, 12b, 12c. While each section 12a, 12b, 12c is vertically upright, the alternative pair of rigid locking members 126 are generally engaged by a corresponding pair of bottom locking receivers 128 which include an upending region 130. During rotation of the sections 12a, 12b, 12c towards a horizontal, open position, the sections 12a, 12b, 12c pivot about a pair of hinges 38 associated with each of the sections 12a, 12b, 12c. The hinges 38 illustrated in FIG. 11 are similar to the hinges in FIG. 7 and may include various hinge types, including an angle bracket swivel hinge which allows for angular rotation of section 12a, 12b, 12c from a generally vertical position downwardly more than 90 degrees for example. As further depicted in FIG. 11, upending region 130 extends upwardly from the generally laterally extending square tube member which traverses the gate receiver 6 behind and along the bottom of the bed 4 near for example a rear bumper. Each of the pair of locking receivers 128 associated with each of the sections 12a, 12b, 12c are configured for secured engagement of each bottom locking member 126. In an operational embodiment associated with FIG. 11, as the handle 22 is operated, the pair of (bottom) rigid locking members 126 travels for engagement into the pair of bottom locking receivers 126.

It is to be understood that while certain forms of the present invention have been illustrated and described herein, it is not to be limited to the specific forms or arrangement of parts described and shown.

What is claimed and desired to be secured by Letters Patent:

1. A rearrangable vehicle tailgate for a transporting an item within a bed of a vehicle at a tailgate receiver, said rearrangable vehicle tailgate comprising:

a first and third section separated by a second section, each of said first and third section securable to the tailgate receiver of the vehicle and said second section;

an enclosed compartment associated with each of said first, second and third sections and providing internal structure;

at least one controller secured to said enclosed compartment by said internal structure and configured for receiving and storing the item during transport by the vehicle;

wherein each controller is removable from said enclosed compartment; and wherein each of said first, second and third sections includes a rotatable cover.

2. The rearrangable vehicle tailgate of claim 1 wherein each of said first, second and third sections are securable to the bed.

3. The rearrangeable vehicle tailgate of claim 1 wherein each of said first, second and third sections are independently movable between an upper and a lower position for selective enclosure of the bed while providing access to an outwardly extending item when at least one of said first, second and third sections is in said lower position.

4. The rearrangeable vehicle tailgate of claim 1 wherein each of said first, second and third sections has a substantially similar width.

5. The rearrangeable vehicle tailgate of claim 1 wherein each of said first, second and third sections includes a handle.

6. The rearrangeable vehicle tailgate of claim 1 wherein said controller includes a pair of side rails separated by a handle end.

7. The rearrangeable vehicle tailgate of claim 1 wherein said controller moves between an open position for receiving the item and a stored position for storing the item.

8. The rearrangeable vehicle tailgate of claim 7 wherein said controller is extended from said internal structure while in said open position.

9. The rearrangeable vehicle tailgate of claim 1 wherein at least one of said controllers includes a drawer configuration and at least one of said controllers includes a telescoping structure.

* * * * *